Sept. 10, 1968     G. F. PFEIFFER     3,400,595
DRIVE MECHANISM FOR CONVERTING ROTARY TO OSCILLATING MOTION
Filed May 23, 1967
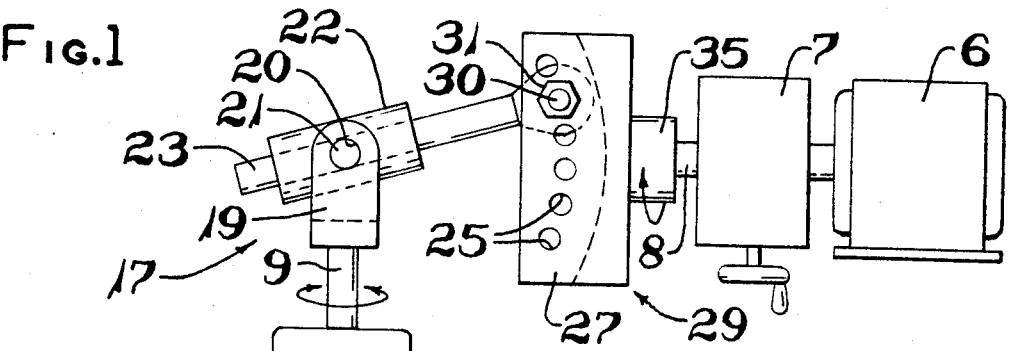
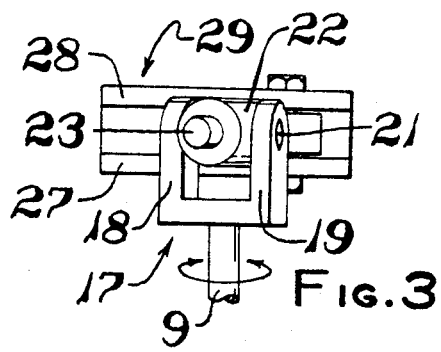
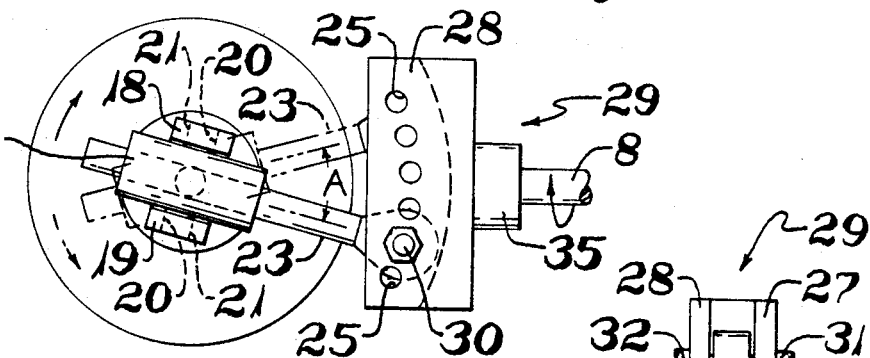
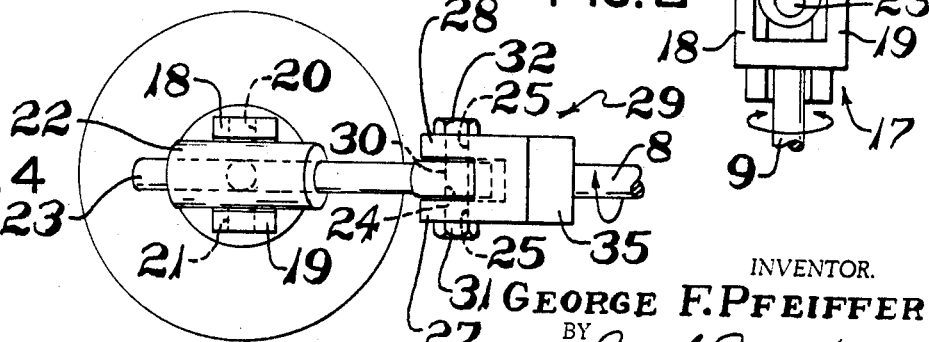
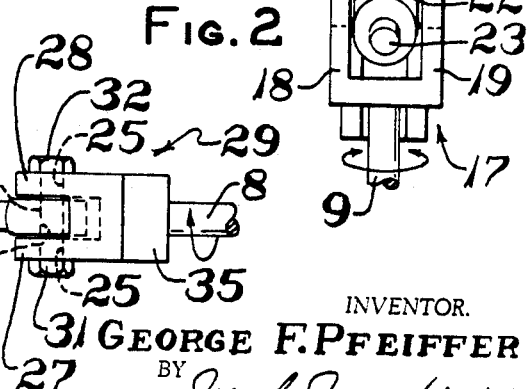
INVENTOR.
GEORGE F. PFEIFFER
BY Joseph Januszkiewicz
ATTY.

United States Patent Office 3,400,595
Patented Sept. 10, 1968

3,400,595
DRIVE MECHANISM FOR CONVERTING ROTARY TO OSCILLATING MOTION
George F. Pfeiffer, Tallmadge, Ohio, assignor to The B. F. Goodrich Company, New York, N.Y., a corporation of New York
Filed May 23, 1967, Ser. No. 640,527
10 Claims. (Cl. 74—47)

ABSTRACT OF THE DISCLOSURE

A drive mechanism for converting a rotary input to an oscillating motion without lost motion therebetween through connecting means which provides means for adjusting the amplitude of oscillation.

---

This invention relates to drive means and more particularly to a mechanism which provides means for converting rotary motion to oscillating motion.

In a testing apparatus, such as a viscurometer, where a test sample of vulcanizable material is subjected to oscillating forces under preset conditions of temperature, it is essential to measure accurately the forces on the input shaft to the test sample to determine the characteristics of the sample. In so measuring the forces on the input shaft to the test sample, it is also necessary to reduce the variables, one of which is in the variation in input forces as in the conversion of the rotary force to an oscillating force with no backlash. In addition, it is desirable to provide means for adjusting the amplitude of oscillation.

The purpose of this invention is to provide a mechanism for converting rotary motion to simple harmonic oscillating motion where there is no backlash and where the amplitude of oscillation can be varied easily and accurately. The present invention contemplates the use of a rotary driven input shaft which oscillates a driven shaft via novel transmission means utilizing pivotal means in combination.

Brief description of the drawings

FIG. 1 is a schematic side elevational view of the drive mechanism shown in operation with a portion of a testing apparatus such as a viscurometer shown only generally.

FIG. 2 is a front elevational view of the drive mechanism.

FIG. 3 is a front elevational view similar to FIG. 2; however, showing the rotation of the input shaft as 270° relative thereto.

FIG. 4 is a plan view of the drive mechanism.

FIG. 5 is a plan view of the drive mechanism similar to FIG. 4 showing in full lines the input shaft rotated 270° relative thereto.

Detailed descripiton

Referring to the drawings, wherein like reference characters designate like or corresponding parts throughout the several views, there is shown in FIG. 1 a motor 6 driving through a variable speed reducer 7 input shaft 8. Input shaft 8 through a driving mechanism to be described, oscillates an output shaft 9, which in turn oscillates the driven part of the test apapratus. The test sample is received between a pair of platens 10 and 11, wherein platen 11, the lower platen, is suitably mounted on the end of a vertically extending piston rod 12 which is attached to a piston movable within a double acting pressure cylinder not shown. Thus with the raising of the lower platen 11, the test sample is confined under pressure between platens 10 and 11 with the drive mechanism providing an oscillating force onto the sample of uncompounded elastomeric materials. A torque sensing pickup device 16 mounted on shaft 9 is adapted to gauge the torsional strain for transmission to a suitable recorder in a manner well known in the art.

The drive mechanism comprises an upwardly extending forked or U-shaped member 17 having a pair of upwardly extending leg members 18 and 19. Each leg member has a bore 20 at the upper end portion thereof in alignment with each other to rotatably receive the respective spaced pivot means 21—21 of a sleeve member 22. Sleeve member 22 has a central bore extending longitudinally therethrough to rotatably receive one end of a rod 23. Such one end portion of rod 23 is journaled in a bearing that is located in the central bore of sleeve member 22 to prevent linear movement relative thereto but facilitates rotation therebetween. The other end portion of rod 23 has an enlarged head portion with a bore 24 extending therethrough for alignment with one set of bores of a plurality of bores 25 of the leg portions 27 and 28 of a bifurcated plate member 29. Such head portion of rod 23 is secured to plate member 29 as by threaded shaft 30 about which rod 23 pivots. Such threaded shaft 30 has nuts 31 and 32 (FIG. 4) to secure such other end portion to the plate member 29 to provide simultaneous rotation therewith. As shown in FIGS. 1 and 5, plate member 29 is arcuately recessed at its intermediate portions to provide such leg portions 27 and 28. The bores 25 on leg portions 27 and 28 extend along an arcuately disposed line which is a fixed distance from the axes of the pivot means 21—21. By changing the connection of rod 23 to plate member 29, rod 23 is adapted to change the degree of oscillation of shaft 9. Plate member 29 has a boss portion 35 which receives and securely fastens to the one end portion of the input shaft 8. If desired boss portion 35 may be made linearly adjustable on shaft 12 to vary the degree of oscillation of shaft 9.

In the operation of the apparatus and drive mechanism above described, energization of motor 6 provides a rotational input to shaft 8 via speed reducer 7 which in turn rotates plate 29 and rod 23. Assuming that the drive mechanism is in the position shown as in FIGS. 1, 2 and 4 such that the plate 29 is in a vertical position, plate 29 will rotate in a counterclockwise direction as viewed in FIG. 2 until rod 23, and sleeve 22 reach the position shown in phantom lines in the plan views in FIG. 5. During such rotation rod 23 will impart to the U-shaped member 17 a pivoting action about shaft 9 which swings U-shaped member and rotates shaft 9 in a counterclockwise direction as viewed in FIG. 5 which is shown by the dotted arrows. Thereafter continued rotation of the input shaft 8 imparts a further rotation to plate member 29 about shaft 8 to swing plate members 29, 90° from the horizontal position as depicted in FIG. 5 to a position where plate member 29 is in a vertical position as depicted in FIG. 2, except that such plate member 29 would be rotated 180°. Such rotation of rod 23 imparts a clockwise rotation to output shaft 9 as illustrated by the solid arrows in FIG. 5. Further rotation of input shaft 8 will swing plate member 29 to the position shown in solid lines in FIGS. 5 and 3 wherein the rod 23 and sleeve 22 and the U-shaped member 17 will rotate shaft 14 in a clockwise direction as illustrated by the arrows in solid lines in FIG. 5. Thereafter continued rotation of input shaft 8 will move plate member 29 from the position shown in FIG. 3 to the position shown in FIG. 1, wherein the shaft 9 will be moved in a counterclockwise direction depicted by the dotted arrows in FIG. 5. Thus, in one complete revolution of shaft 8, shaft 9 oscillates to thereby impart to the test sample which is confined by the platens 10 and 11 an oscillating force whose resistance can be measured by the pickup device 16.

It should be understood, of course, that the foregoing disclosure relates to only a preferred embodiment of the invention and the modifications or alterations may be made therein without departing from the spirit and the scope of the invention as set forth in the appended claims.

I claim:

1. An apparatus for providing an oscillating force to a test sample confined to an enclosure comprising drive means, an input shaft operatively connected to said drive means for rotation thereby, an output shaft journaled on said apparatus for rotation about an axis operative to provide an oscillating force to such test sample, connecting means interconnecting said output shaft to said input shaft, said connecting means including a first member and second member, said first member being pivotably connected to said second member, said first member having a bore extending longitudinally therethrough, a transmission member having one end journaled to provide a journal connection in said bore of said first member for rotation relative thereto, said journal connection securing said transmission member to said first member to prevent linear movement therebetween, said transmission member having its other end portion secured to said input shaft for rotation therewith, and said second member secured to said output shaft for rotation and oscillation therewith.

2. An apparatus as set forth in claim 1 wherein said second member has its one end bifurcated to pivotally journal said first member and its other end secured to said output shaft for oscillation therewith.

3. An apparatus as set forth in claim 2 wherein said transmission member has a longitudinal center line that extends centrally through said bore, and said longitudinal center line lies along a line that intersects a line passing through the axis of rotation of said input shaft and defines an acute angle therebetween.

4. An apparatus as set forth in claim 3 wherein said other end portion is adjustably connected to said input shaft to adjust and vary said acute angle.

5. An apparatus as set forth in claim 4 wherein said drive means has a variable input operative to provide a variable input speed to said input shaft.

6. An apparatus for providing an oscillating force to a test sample confined to an enclosure comprising drive means, an input shaft operatively connected to said drive means for rotation thereby, an output shaft journaled on said apparatus for oscillation about an axis, means interconnecting said output shaft to said input shaft, said interconnecting means including a first member and second member, said second member having one end secured to said output shaft for oscillation therewith, the other end of said second member being bifurcated, said first member having a pair of laterally spaced bearings journaled on said bifurcated end portion of said second member for pivotal movement relative thereto, said first member having a bore extending therethrough with the center line of said bore being normal to the axis of rotation of said laterally spaced bearings, a rod having one end journaled in said bore for connection to said first member and for rotation relative thereto, said interconnecting means including a plate member secured to said input shaft, the other end portion of said rod secured to said plate member for rotation therewith, said plate member having a plurality of spaced bores, and means for interconnecting said other end portion of said rod to selected ones of said bores in said plate member to transmit motion from said plate member to said second member.

7. An apparatus as set forth in claim 6 wherein said plate member has a plurality of spaced bores lying along a line equidistant from the intersection of the axis of oscillation of said output shaft and the axis of rotation of said rod, said other end of said rod having a hole therein for registering with one of said spaced bores, and securing means operable to be received by one of said spaced bores on said plate member and said hole in said rod to interconnect said rod to said plate.

8. A motion transmitting device comprising an input shaft, drive means mounted on a support frame and connected to said input shaft for rotating said shaft, said input shaft having a support member secured thereto for rotation therewith, an output shaft mounted on said support frame for oscillation thereon, a forked member secured to said output shaft for oscillation therewith, said forked member having a pair of coaxially spaced bores lying on an axis that is normal to the axis of oscillation of said output shaft, a sleeve member having a pair of laterally extending bearings journaled in said bores for pivotal movement therein, said sleeve having a bore extending therethrough whose axis intersects the axis of coaxially spaced bores on said forked member, a rod member having one end journaled in said bore of said sleeve and secured to said sleeve for oscillation therewith, and the other end of said rod member pivotally secured to said support member wherein the axis of said rod makes an acute angle with the axis of rotation of said input shaft.

9. A motion transmitting device as set forth in claim 8 wherein said support member is linearly adjustable on said input shaft to vary the acute angle to provide a preselected oscillation of said output shaft.

10. A motion transmitting device as set forth in claim 8 wherein said support member has a plurality of spaced bores lying along a line equidistant from the intersection of the axis of oscillation of said output shaft and the axis of rotation of said rod, means for securing said other end of said rod member to one of said spaced bores to adjust said acute angle.

References Cited

UNITED STATES PATENTS

| | | | |
|---|---|---|---|
| 899,025 | 9/1908 | Brewer et al. | 74—70 |
| 2,830,457 | 4/1958 | Dyer et al. | 74—47 X |
| 3,149,494 | 9/1964 | Hulse | 74—47 |

FRED C. MATTERN, Jr., *Primary Examiner.*

LEONARD H. GERIN, *Assistant Examiner.*